United States Patent [19]
Kersey

[11] Patent Number: 5,054,922
[45] Date of Patent: Oct. 8, 1991

[54] DIFFERENTIAL POLARIMETRIC FIBER OPTIC SENSOR

[75] Inventor: Alan D. Kersey, Springfield, Va.

[73] Assignee: The United States of America as represented by the Secretary of the Navy, Washington, D.C.

[21] Appl. No.: 465,677

[22] Filed: Jan. 16, 1990

[51] Int. Cl.$^5$ ............................................. G01B 9/02
[52] U.S. Cl. .................................. 356/345; 356/351; 250/227.19
[58] Field of Search ............................ 356/345, 351; 250/227.19

[56] References Cited

U.S. PATENT DOCUMENTS 4,564,289 1/1986 Spellman.
4,642,458 2/1987 Jackson et al..
4,882,716 11/1989 Lefevre et al. .................... 356/345

OTHER PUBLICATIONS

Publication, Compensated Polarimetric Sensor Using Polarization-Maintaining Fibre in a Differential Configuration, by J. P. Dakin and C. A. Wade, Electronics Letter, vol. 20, No. 1, pp. 51-53, Jan. 5, 1984.
Publication, Differential Polarimetric Fiber-Optic Sensor Configuration with Dual Wavelength Operation, by Alan D. Kersey, M. A. Davis, and M. J. Marrone, Applied Optics, vol. 28, No. 2, pp. 204-206, Jan. 15, 1989.

Primary Examiner—Samuel Turner
Attorney, Agent, or Firm—Thomas E. McDonnell; George Jameson

[57] ABSTRACT

A differential polarimetric fiber optic sensor is disclosed in which a local compensating fiber section is spatially separated from a remote sensing fiber section by input and output polarization-maintaining fibers in order to permit the remote passive interrogation of the remote sensing fiber section by the direct polarization analysis of the light at the output of the local compensating fiber section.

16 Claims, 3 Drawing Sheets

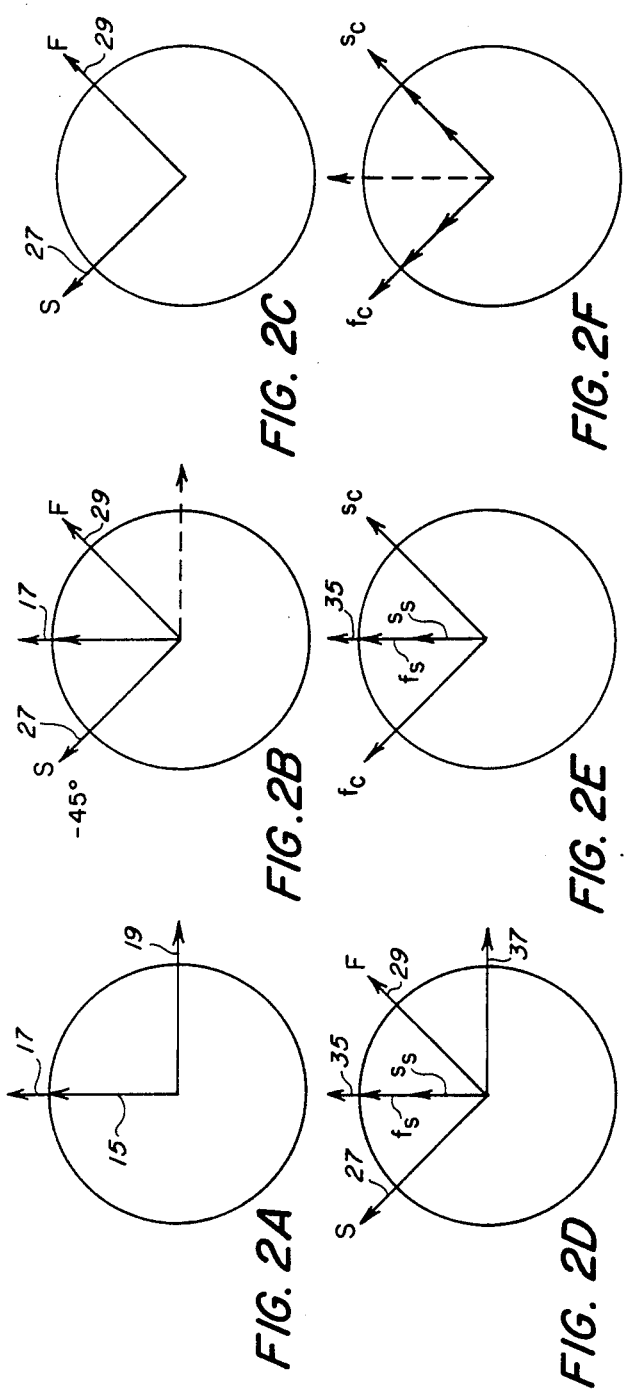

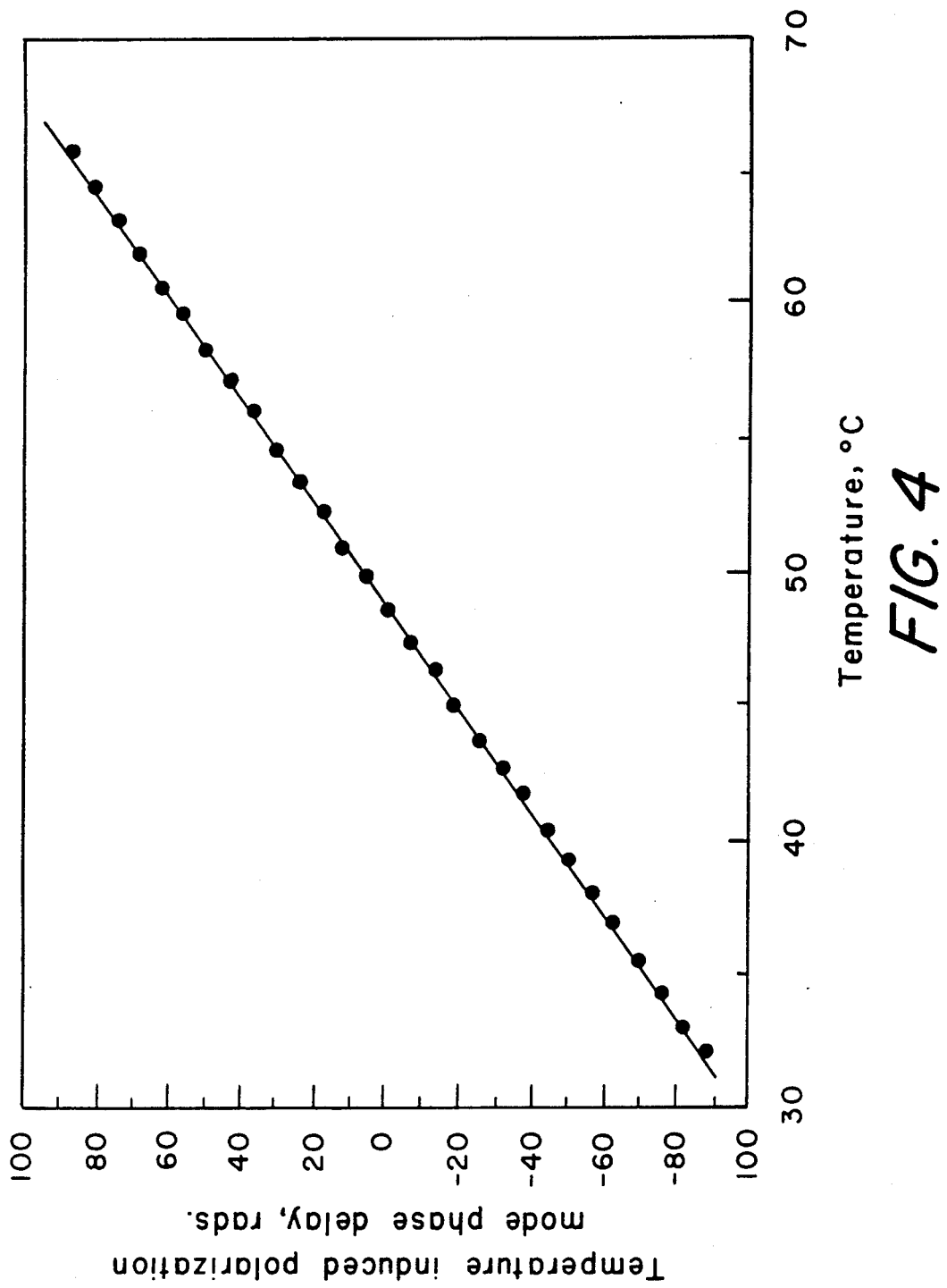

DIFFERENTIAL POLARIMETRIC FIBER OPTIC SENSOR

BACKGROUND OF THE INVENTION

1. Field of the Invention

The present invention relates to sensors and particularly to a differential polarimetric fiber optic sensor.

2. Description of the Prior Art

In one prior art type of polarimetric fiber optic sensor, a compensated-polarimetric fiber optic sensor configuration was used. In such a configuration, a broadband source can be used. In this compensated-polarimetric fiber optic sensor configuration, sensing and reference sections of high birefringence single-mode fiber are spliced directly together with their polarization axes rotated 90° with respect to each other. If the lengths of the two sections are well matched, the effective modal path imbalance experienced by the two polarization components propagating through the overall system is close to zero, and a light source of low coherence length can be used. However, since the sensing and reference sections are coupled directly together, both sections can be subjected to the same measurand, which can introduce errors into the sensor.

A typical difficulty with polarimetric configurations results from the demodulation or "linearization" of the measurand-induced modulation in the polarization mode phase delay in situations where the sensing fiber section is required to operate passively and remotely from the detection electronics. Techniques based on laser frequency modulation, similar to those used for the demodulation of interferometric sensors, have been adopted with non-compensated polarimetric sensors. However, these techniques require sensor fiber lengths of tens of meters to provide a sufficient effective path imbalance between the polarization modes of the fiber for the operation of the technique, and a single frequency diode laser source is necessary to implement the technique.

OBJECTS OF THE INVENTION

Accordingly, one object of the invention is to provide a novel differential polarimetric fiber optic sensor.

Another object of the invention is to provide a differential polarimetric fiber optic sensor configuration which allows the interrogation of a remote birefringent sensing fiber by way of insensitive fiber leads by using a local birefringent compensating fiber.

A further object of the invention is to provide a compensated-polarimetric fiber optic sensor configuration in which the sensing and compensating fiber sections are spatially separated from each other to permit the remote passive interrogation of the remote sensing fiber section by the direct polarization analyses of the light emanating from the output of the local compensating fiber section.

SUMMARY OF THE INVENTION

These and other objects of the invention are achieved by providing a differential polarimetric fiber optic sensor configuration in which a local compensating fiber section is spatially separated from a remote sensing fiber section by input and output polarization-maintaining fibers in order to permit the remote passive interrogation of the remote sensing fiber section by the direct polarization analysis of the light at the output of the local compensating fiber section.

BRIEF DESCRIPTION OF THE DRAWINGS

These and other objects, features and advantages of the invention, as well as the invention itself, will become better understood by reference to the following detailed description when considered in connection with the accompanying drawings wherein like reference numerals designate identical or corresponding parts throughout the several views and wherein:

FIGS. 2A through 2F illustrate representations of polarization modes useful in understanding the operation of the preferred embodiment of FIG. 1;

FIG. 3 illustrates four optical paths for the various optical components that pass through the preferred embodiment of FIG. 1; and FIG. 4 illustrates a change in the polarization mode phase delay of the sensing fiber section of FIG. 1 when the sensing fiber is heated over the range 30°–65° C.

DETAILED DESCRIPTION OF THE PREFERRED EMBODIMENT

Figure 1:
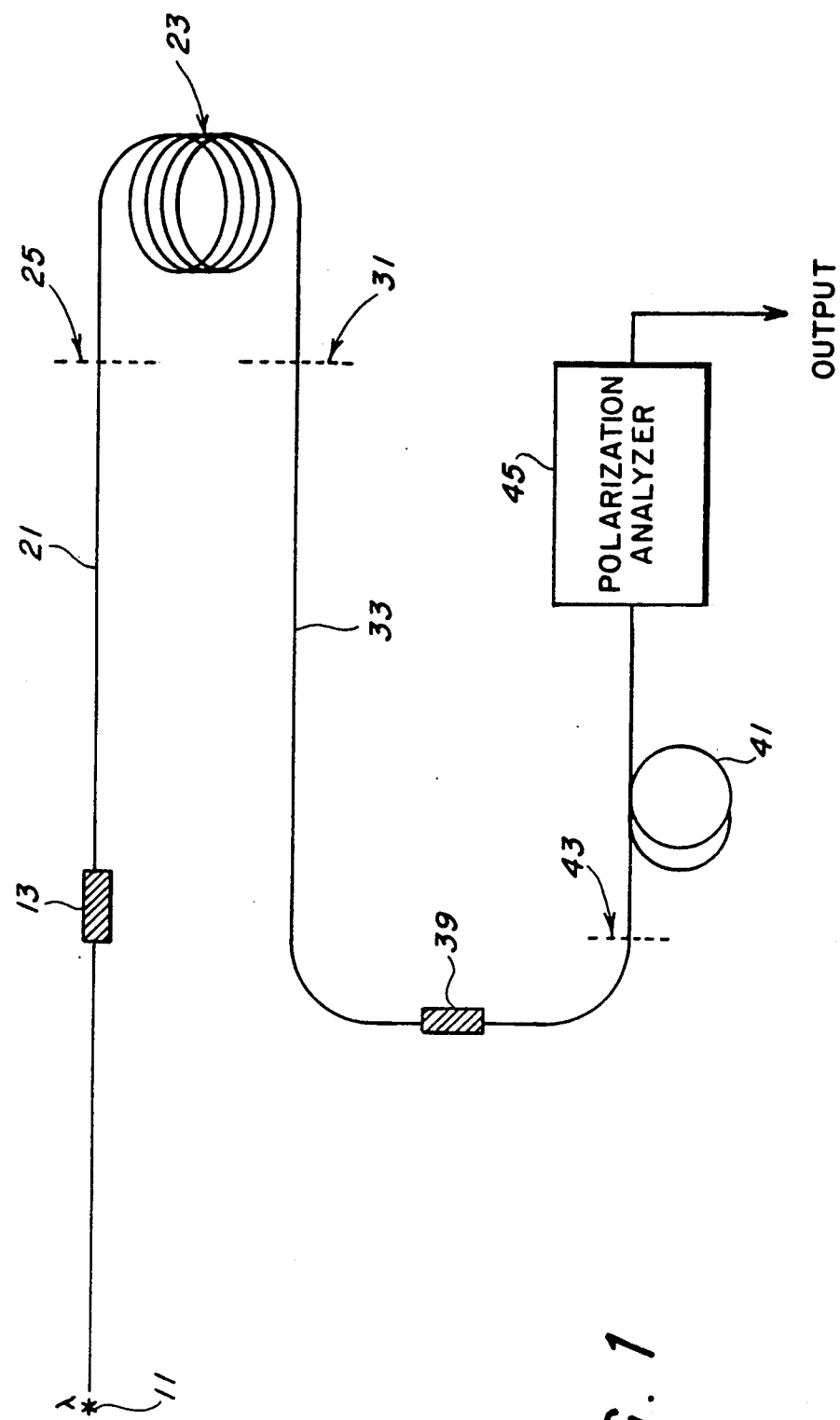
FIG. 1 illustrates a preferred embodiment of the invention.

Referring now to the drawings, FIG. 1 illustrates a differential polarimetric fiber optic sensor in accordance with a preferred embodiment of the invention, while FIGS. 2A–2F illustrate representations of the polarization modes at various locations along the differential polarimetric fiber optic sensor of FIG. 1. For ease of understanding the operation of the polarimetric fiber optic sensor of FIG. 1, the polarization modes of FIGS. 2A–2F will be discussed in conjunction with the discussion of the operation of the polarimetric fiber optic sensor of FIG. 1.

Light from a broadband source 11 (short coherence length, $l_c$, i.e. a super-luminscent diode) is propagated through a fiber polarizer 13 to develop linearly polarized light 15 (FIG. 2A). A bulk optic polarizer could be utilized in place of the fiber polarizer 13. This polarized light 15 is conveyed from the polarizer 13, through one polarization mode 17 of the two polarization modes 17 and 19 (FIG. 2A) of a high birefringence or polarization-maintaining input fiber 21, to a remotely-located sensing fiber or sensing fiber section 23 of length $L_s$ and birefringence $B_s$.

The sensing fiber 23 is also a high birefringence or polarization-maintaining fiber which exhibits a change in birefringence when stressed by a measurand, such as pressure, temperature or strain. At a position 25, the sensing fiber 23 is spliced to the input fiber 21 with an orientation such that its orthogonal slow (s) and fast (f) axes 27 and 29 are at ±45° to the axes 17 and 19 of the input fiber 21. As a result, the input polarization mode 17 (FIG. 2A) through which the polarized light 15 (FIG. 2A) is propagating in the input fiber 21 lies between the slow and fast axes 27 and 29 of the sensing fiber section 23, as shown in FIG. 2B. Consequently, the polarized light 17 in the polarization mode 17 excites both of the slow and fast modes 27 and 29 of the sensing fiber 23 and divides itself into both of those slow and fast modes 27 and 29, as shown in FIG. 2C. If the orientations of the modes 27 and 29 of the sensing fiber 23 are ±45° with respect to the mode 17 of the input fiber 17, the polarized light 15 will divide evenly between the modes 27 and 29, with one half of the light 15 going into each of the slow and fast modes 27 and 29 of the sensing fiber 23, since 45° is the optimum coupling angle.

The sensing fiber section 23 is utilized to sense a measurand, such as temperature, pressure or strain. In general, the sensed measurand will change the length of the sensing fiber 23. However, in the embodiment of FIG. 1, the measurand changes the birefringence of the sensing fiber 23, i.e., the difference in the refractive index between the slow and fast axes or modes 27 and 29 of the sensing fiber 23. In other words, the measurand changes the propagation time difference between the slow and fast axes of the sensing fiber.

Light propagates through the sensing fiber 23 in both the slow and fast axes 27 and 29 of the sensing fiber 23, with the light in the fast axis 29 propagating at a faster speed than the light through the slow axis 27. The propagation speed of the light in the sensing fiber 23, and more essentially the differential propagation speed between the fast and slow axes 29 and 27, is very dependent on the measurand which acts on the sensing fiber 23.

At a position 31, the output end of the sensing fiber 23 is spliced to a high birefringence or polarization-maintaining output fiber 33 with an orientation such that its orthogonal slow and fast polarization axes 27 and 29 are at ±45° to a polarization axis 35 of the orthogonal polarization axes or modes 35 and 37 of the output fiber 33, as shown in FIG. 2D. As a result, light components $s_s$ and $f_s$ from the slow and fast axes 27 and 29 of the sensing fiber 23 are resolved onto or along the polarization mode 35 of the output fiber 33, as shown in FIG. 2D.

At the position 31, the light components $s_s$ and $f_s$ from the slow and fast axes or modes 27 and 29 are seen at different optical path lengths because of the difference in the refractive index of the slow and fast modes 27 and 29. It should be noted at this time that if that difference in optical path lengths is greater than the optical coherence length of the source 11, then the light at this position 31 is essentially depolarized because the phase coherency between the slow and fast modes 27 and 29 has been lost. Such is the case here, since the source 11 is selected to have an optical coherence length that is shorter than the optical path length difference between the slow and fast axes 27 and 29 of the sensing fiber 23. For example, a typical high birefringence sensing fiber 23 of 2 meters in length could easily generate an optical path length difference of effectively several millimeters between the slow and fast axes 27 and 29, while a super luminescent diode source 11 would have a coherence length on the order of 100 microns. Thus, when such components are selected for use in FIG. 1, the light at the position 31 is essentially depolarized.

A fiber polarizer 39 is included as a continuous part of the output fiber 33. However, a bulk optic polarizer could be substituted for the fiber polarizer 39. The fiber polarizer 39 operates to suppress the polarization mode 37 (FIG. 2D) and just pass the polarization mode 35, which contains the slow and fast components $s_s$ and $f_s$, along the output fiber 33, as shown in FIG. 2E.

The $f_s$ and $s_s$ components of the polarization mode 35 (FIG. 2E) are conveyed from the polarizer 39, through the remaining portion of the output fiber 33, to a compensating fiber or compensating fiber section 41 of length $L_c$ and birefringence $B_c$. The compensating fiber 41 is also a high birefringence or polarization-maintaining fiber. In an exemplary embodiment, the length $L_s$ of sensing fiber 23 equals the length $L_c$ of the compensating fiber 41, and the birefringence $B_s$ of the sensing fiber 23 equals the birefringence $B_c$ of the compensating fiber 41.

At a position 43, the compensating fiber 41 is spliced to the output fiber 33 with an orientation such that its orthogonal fast (f) and slow (s) axes $f_c$ and $s_c$ are at ±45° to the axis or mode 35 of the output fiber 33. As a result, the polarization mode 35, through which the components $f_s$ and $s_s$ are propagating in the output fiber 33, lie between the fast and slow axes $f_c$ and $s_c$ of the compensating fiber section 41, as shown in FIG. 2E. Consequently, the light in the propagation mode 35 (components $f_s$ and $s_s$) excites both of the fast and slow modes $f_c$ and $s_c$ of the compensating fiber 41 and divides itself into each of the $f_c$ and $s_c$ axes or modes of the compensating fiber 41, as shown in FIG. 2F. If the orientations of the modes $f_c$ and $s_c$ of the compensating fiber 41 are ±45° with respect to the mode 35 of the output fiber 33, the light in mode 35 will divide itself evenly between the modes $f_c$ and $s_c$, with one half of the light components $f_s$ and $s_s$ going into each of the fast and slow modes $f_c$ and $s_c$ of the compensating fiber 41, as shown in FIG. 2F.

The output of the compensating fiber 41 is comprised of linear components (to be explained) of a polarization state comprised of light from the fast and slow axes of the compensating fiber 41. This light can be analyzed by a polarization analyzer 45 to develop an interference pattern representative of the change in the measurand acting on the sensing fiber 23. The polarization analyzer 45 can be either fiber of bulk polarization optics or can even be a simple polarizer.

As explained above, the sensing fiber section 23 and the compensating fiber section 41 are separated from each other by an insensitive output fiber 33. Thus, the differential polarimetric fiber optic sensor of FIG. 1 allows the passive remote interrogation of the sensing fiber section 23 by way of insensitive input and output polarization-maintaining fibers 21 and 33, respectively.

It has previously been assumed that the birefringence $B_s$ of the sensing fiber 23 was equal to the birefringence $B_c$ of the compensating fiber 41, and that the length $L_s$ of the sensing fiber 23 was equal to the length $L_c$ of the compensating fiber 41. However, these are not requirements of the differential polarimetric fiber optic sensor of FIG. 1. Sensing and compensating fiber sections 23 and 41 of different respective linear birefringences $B_s$ and $B_c$ could be used, provided that the equality $B_s \cdot L_s = B_c \cdot L_c$ is satisfied (i.e. close to equal effective optical path imbalance between the polarization modes in each of the fiber sections 23 and 41).

Referring now to FIG. 3, there are four optical paths shown for the various optical or light components that pass through the differential polarimetric fiber optic sensor of FIG. 1. For purposes of explanation, the light components that go through these four paths will be designated as light components $\underline{a}$, $\underline{b}$, $\underline{c}$ and $\underline{d}$.

Light component $\underline{a}$ comes from source 11, passes through the fast axis (f) of sensing fiber 23, passes through the fast axis (f) of the compensating fiber 41, and has traversed the optical path ff by the time that it reaches the input to the polarization analyzer 45. Light component $\underline{b}$ comes from the source 11, passes through the fast axis (f) of sensing fiber 23, passes through the slow axis (s) of the compensating fiber 41, and has traversed the optical path fs by the time that it reaches the input to the polarization analyzer 45. Light component $\underline{c}$ comes from the source 11, passes through the slow axis (s) of the sensing fiber 23, passes through the slow axis (s) of the compensating fiber 41, and has traversed the optical path ss by the time that it reaches the input of the polarization analyzer 45. Finally, light component d comes from the source 11, passes through the slow axis (s) of the sensing fiber 23, passes through the fast axis (f) of the compensating fiber 41, and has traversed the optical path sf by the time that it reaches the input of the polarization analyzer 45.

The above-described light components (a, b, c and d) are the only four light components that pass through the polarimetric fiber optic sensor of FIG. 1. The important point to remember is that the optical path difference between the fast and slow axes in the sensing fiber 23 is equal to the optical path difference between the fast and slow axes in the compensating fiber 41. So the light component b which has traveled the optical path fs and the light component d which has traveled the optical path sf will have traveled equal path lengths. As a result, the light components b and d will recombine at the output of the compensating fiber 41 to form a polarized part of the light that is applied to the polarization analyzer 45. On the other hand, the light components a and c, which have respectively traveled light path lengths of ff and ss, are even further out of phase with each other and with the light components b and d. As a result, only the light components b and d combine to produce an optical signal representative of the change in the measurand acting on the sensing fiber. The light components a and c only result in a background intensity at the output which effectively reduces the visibility. The light components b and d from the compensating fiber 41 are then applied to the polarization analyzer 45 to develop an interference pattern indicative of the change in the measurand which is acting on the sensing fiber 23.

FIG. 4 shows the change in the polarization mode phase delay of a two meter long sensing fiber 23 when the sensing fiber 23 is heated over the range 30°-65°.

Therefore, what has been described is a differential polarimetric fiber optic sensor in which a local compensating fiber section is spatially separated from a remote sensing fiber section by input and output polarization-maintaining fibers in order to permit the remote passive interrogation of the remote sensing fiber section by the direct polarization analysis of the light at the output of the local compensating fiber section.

It should therefore readily be understood that many modifications and variations of the present invention are possible within the purview of the claimed invention. It is therefore to be understood that, within the scope of the appended claims, the invention may be practiced otherwise than as specifically described.

What is claimed and desired to be secured by Letters Patent of the United States is:

1. A polarimetric fiber sensor comprising:
a first polarization-maintaining fiber;
means for propagating polarized light into a first polarization mode of said first polarization-maintaining fiber;
a sensing fiber of the kind exhibiting birefringence when stressed by a measurand, said sensing fiber having a birefringence $B_s$, a length $L_s$ and an input end coupled to said first polarization-maintaining fiber to enable said polarized light from said first polarization mode of said first polarization-maintaining fiber to be divided between fast and slow axes of said sensing fiber;
a second polarization-maintaining fiber having a first end coupled to an output end of said sensing fiber to enable fast and slow components of light from the respective said fast and slow axes of said sensing fiber to be resolved along a first polarization mode of said second polarization-maintaining fiber;
a compensating fiber having a birefringence $B_c$ and a length $L_c$ whose product $B_cL_c$ is substantially equal to the product $B_sL_s$ of said sensing fiber, said compensating fiber having a first end coupled to a second end of said second polarization-maintaining fiber to enable said fast and slow components of light from said first polarization mode of said second polarization-maintaining fiber to be resolved into each of fast and slow axes of said compensating fiber; and
polarization analyzer means being responsive to light from said fast and slow axes of said compensating fiber for developing an interference pattern signal representative of the change in the measurand acting on said sensing fiber.

2. The polarimetric sensor of claim 1 wherein said propagating means includes:
a source of broadband light; and
a first polarizer coupled to said first polarization-maintaining fiber, said first polarizer being responsive to broadband light from said source for developing said polarized light and applying said polarized light to said first polarization mode of said first polarization-maintaining fiber.

3. The polarimetric sensor of claim 2 wherein:
said source of broadband light has a coherence length that is shorter than the optical path length difference between the fast and slow axes of said sensing fiber.

4. The polarimetric sensor of claim 2 wherein:
said first polarizer is a first fiber polarizer which forms part of said first polarization-maintaining fiber.

5. The polarimetric sensor of claim 1 wherein:
said first polarization-maintaining fiber is coupled to said input end of said sensing fiber with a polarization orientation such that said first polarization mode of said first polarization-maintaining fiber is between said fast and slow axes of said sensing fiber.

6. The polarimetric sensor of claim 1 wherein:
said first polarization-maintaining fiber is coupled to said input end of said sensing fiber with a polarization orientation therebetween such that said first polarization mode of said first polarization-maintaining fiber is angularly displaced from each of said fast and slow axes of said sensing fiber by substantially 45°.

7. The polarimetric sensor of claim 6 wherein:
said second polarization-maintaining fiber is coupled to said output end of said sensing fiber with a polarization orientation therebetween such that said first polarization mode of said second polarization-maintaining fiber is angularly displaced from each of said fast and slow axes of said sensing fiber by substantially 45°.

8. The polarimetric sensor of claim 1 further including:
a polarizer coupled between said second polarization-maintaining fiber and said compensating fiber for suppressing light in a second polarization mode of said second polarization-maintaining fiber and passing said fast and slow components of light in said first polarization mode of said second polarization-maintaining fiber.

9. The polarimetric sensor of claim 8 wherein:
said polarizer is a fiber polarizer which forms part of said second polarization-maintaining fiber.

10. The polarimetric sensor of claim 9 wherein:
said second end of said second polarization-maintaining fiber is coupled to said first end of said compensating fiber with a polarization orientation such that said first polarization mode of said second polarization-maintaining fiber is between said fast and slow axes of said compensating fiber.

11. The polarimetric sensor of claim 2 wherein:
said first polarization-maintaining fiber is coupled to said input end of said sensing fiber with a polarization orientation therebetween such that said first polarization mode of said first polarization-maintaining fiber is angularly displaced from each of said fast and slow axes of said sensing fiber by substantially 45°; and
said second polarization-maintaining fiber is coupled to said output end of said sensing fiber with a polarization orientation therebetween such that said first polarization mode of said second polarization-maintaining fiber is angularly displaced from each of said fast and slow axes of said sensing fiber by substantially 45°.

12. The polarimetric sensor of claim 11 wherein:
said first polarizer is a first fiber polarizer which forms part of said first polarization-maintaining fiber.

13. The polarimetric sensor of claim 11 further including:
a second polarizer coupled between said second polarization-maintaining fiber and said compensating fiber for suppressing light in a second polarization mode of said second polarization-maintaining fiber and passing said fast and slow components of light in said first polarization mode of said second polarization-maintaining fiber.

14. The polarimetric sensor of claim 13 wherein:
said first polarizer is a first fiber polarizer which forms part of said first polarization-maintaining fiber; and
said second polarizer is a second fiber polarizer which forms part of said second polarization-maintaining fiber.

15. The polarimetric sensor of claim 13 wherein:
said second end of said second polarization-maintaining fiber is coupled to said first end of said compensating fiber with a polarization orientation such that said first polarization mode of said second polarization-maintaining fiber is between said fast and slow axes of said compensating fiber.

16. The polarimetric sensor of claim 15 wherein:
said first polarizer is a first fiber polarizer which forms part of said first polarization-maintaining fiber; and
said second polarizer is a second fiber polarizer which forms part of said second polarization-maintaining fiber.

* * * * *